Feb. 20, 1940.                A. LISOWSKI                 2,191,172
                       MEANS OF TRANSMISSION OF POWER
                          Filed March 28, 1938            4 Sheets-Sheet 1
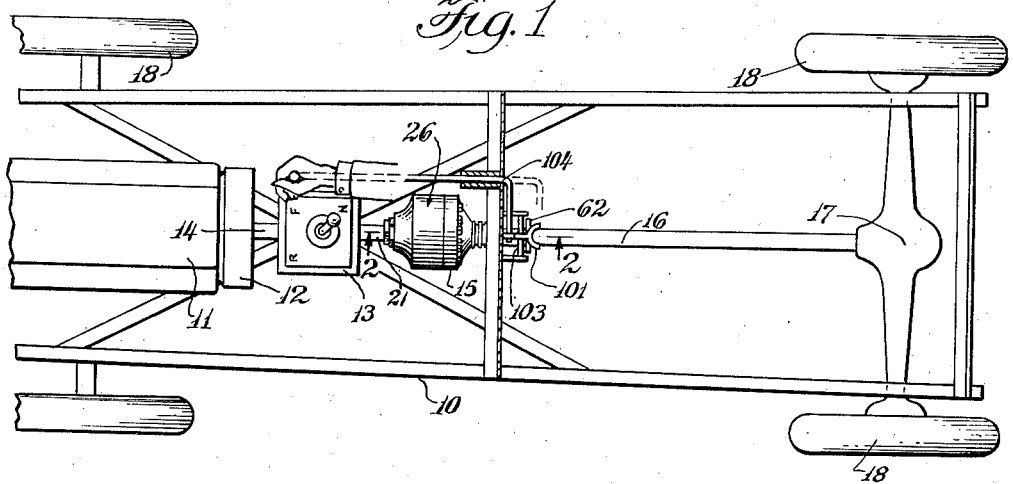
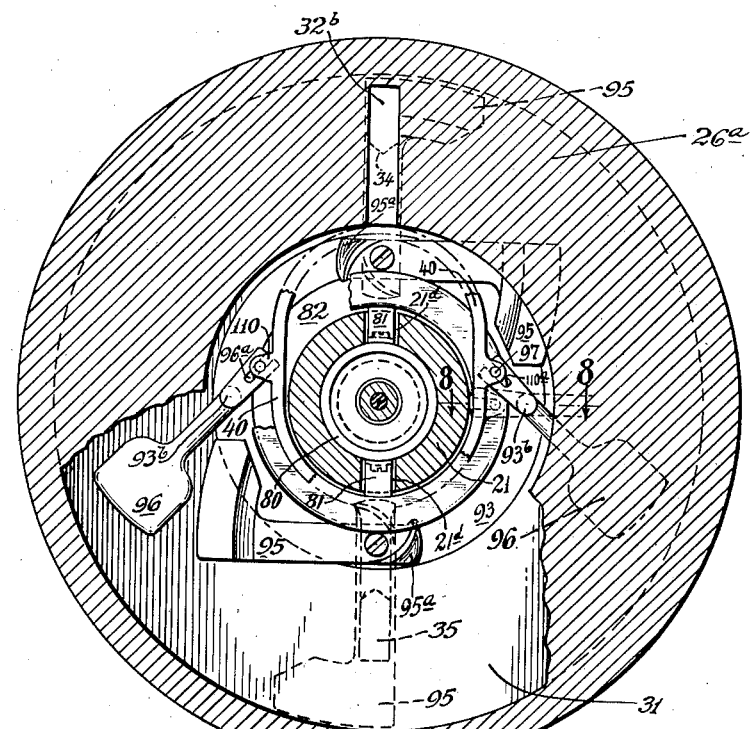
INVENTOR.
Anthony Lisowski
BY
ATTORNEY.

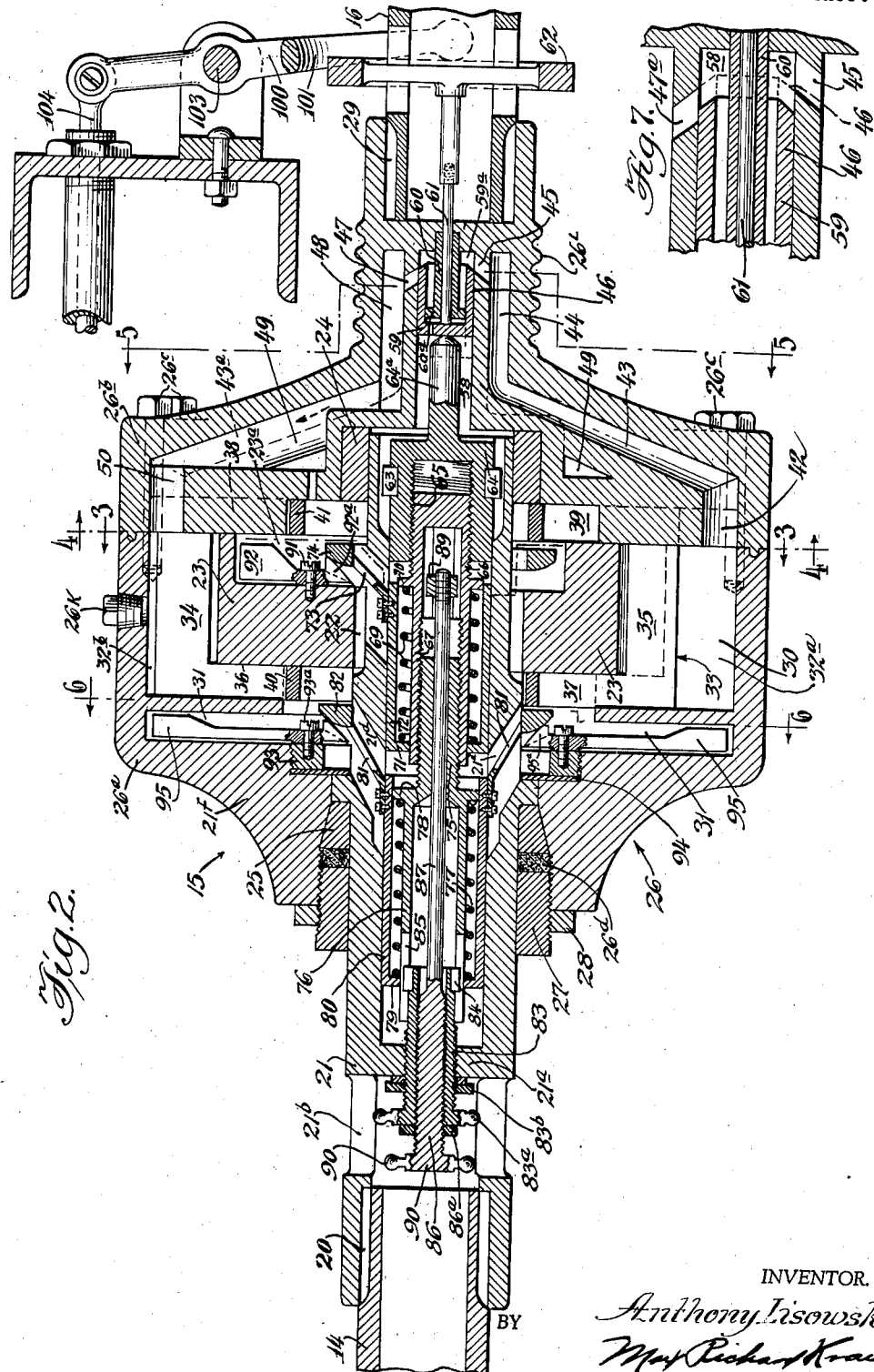

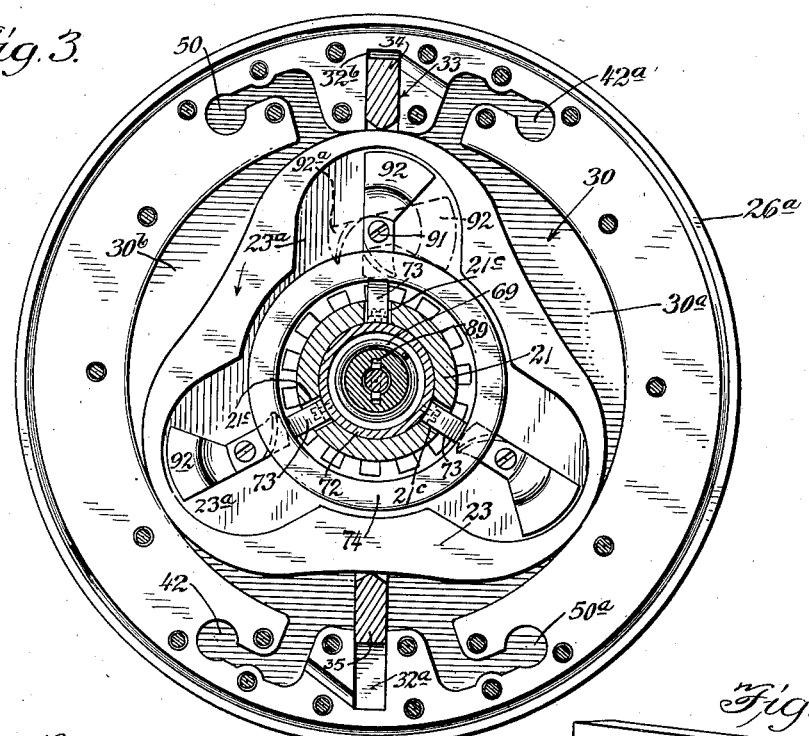

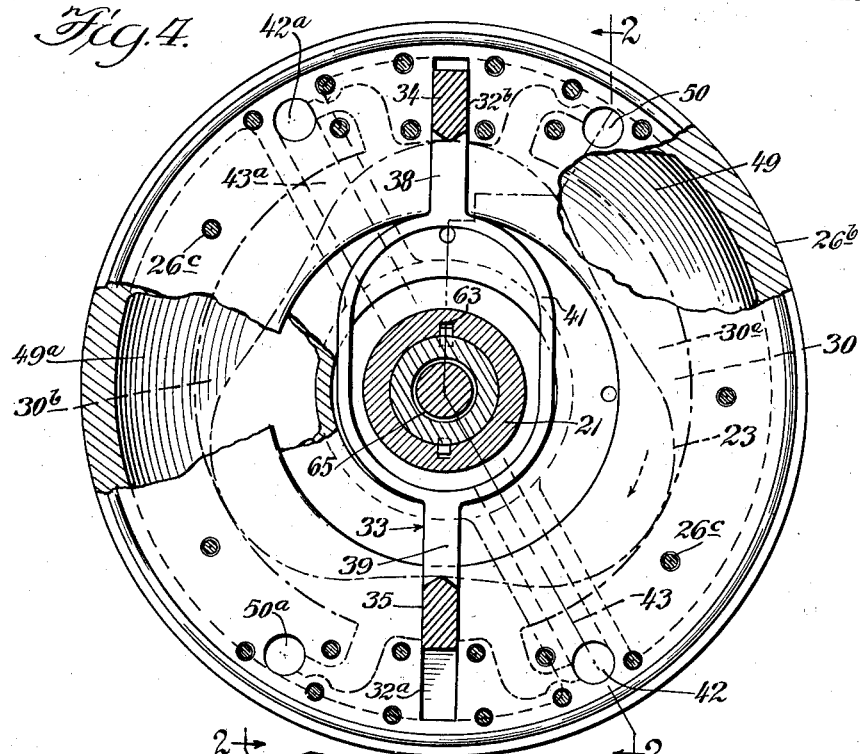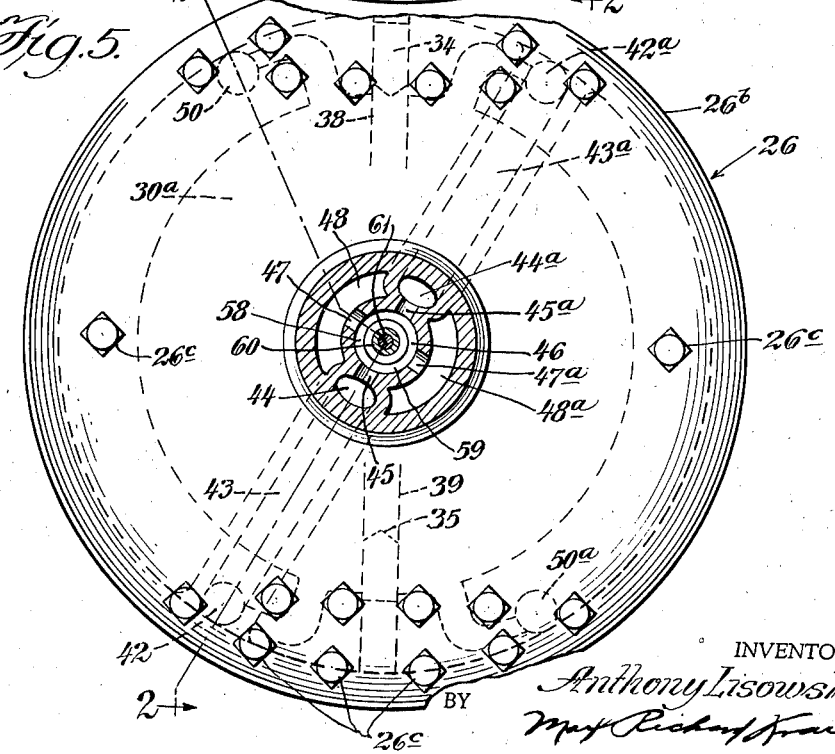

Patented Feb. 20, 1940

2,191,172

UNITED STATES PATENT OFFICE 2,191,172

MEANS OF TRANSMISSION OF POWER

Anthony Lisowski, Chicago, Ill.

Application March 28, 1938, Serial No. 198,451

13 Claims. (Cl. 192—58)

This invention relates generally to means of transmission of power and more particularly to the transmission of power from a prime mover by hydraulic means.

One of the objects of this invention is to provide a device which is automatic in its operation and not dependent upon manual control.

Another object is to provide a device of this character which eliminates the use of a clutch when used in conjunction with the power system of an automobile.

Another object is to provide a device which serves automatically to adjust the power yielded to the power required without manual operation such as the shifting of gears.

Other objects of the invention and the various advantages and characteristics of the construction will be apparent from a consideration of the following detailed description.

This invention contemplates the action of a fluid pump in a self contained unit in which the fluid is permitted to circulate. When the output fluid is permitted to circulate freely, that is, pass directly into the intake port of the pump no stress is exerted on any part of the pump. However, when the flow of output fluid is restricted a revolving stress is exerted on the pump housing causing it to revolve together with the propellor of the pump.

As will be presently described it will be seen that fluid is pumped or circulates only when the power required does not equal the power yielded. The automatic feature of this invention equalizes both and when a balance is reached there is no circulation of fluid and the whole device is thereby caused to revolve as a unit.

Fig. 1 is a plan view of an automobile chassis showing my invention applied thereto.

Fig. 2 is a cross sectional view of my invention taken on the line 2—2 of Fig. 5.

Fig. 3 is a cross sectional view taken on line 3—3 of Figure 2.

Fig. 4 is a cross sectional view taken on line 4—4 of Figure 2.

Fig. 5 is an elevational view partly in cross section taken on line 5—5 of Figure 2.

Fig. 6 is a cross sectional view taken on line 6—6 of Figure 2.

Fig. 7 is a cross sectional view of the valve port opening showing same in open position.

Fig. 8 is a cross sectional view of the counterweights taken on line 8—8 of Fig. 6.

Fig. 9 is a perspective view of the chamber sealing member.

Fig. 10 is an elevational view of the device showing same operated as a pulley in cooperation with an electric motor.

As shown in the drawings my invention is applied to a motor vehicle but it will be understood that in its other uses a pulley can be connected to the driven shaft of the device or the device itself can be used as a pulley. As shown in Fig. 1, the motor vehicle 10 has a prime mover or motor 11, a clutch 12, a gear transmission 13, a driving shaft 14, my hydraulic mechanism indicated generally at 15, a driven shaft 16, differential 17 and traction wheels 18.

Rotatably supported on the core shaft 21, by bronze bearings 24 and 25 is a housing generally indicated at 26, keyed as at 29 to the driven shaft 16, and provided with a packing gasket 26d and locking nuts 27 and 28.

The housing 26 comprised of sections 26a and 26b suitably bolted together as at 26c, forms, interiorly a chamber generally indicated at 30, within which revolves the cam 23, and another annular chamber 31, within which operate the governors presently to be described. Section 26a has a plug 26k to close the opening through which fluid is introduced in the chamber. The section 26b is also provided with radiating fins 26l for the purpose of facilitating cooling of the fluid circulating within my device. The housing sections 26a and 26b are provided with guide channels 32a and 32b. Adapted to be actuated by the cam 23 and to reciprocate within said channels is a sealing member indicated generally at 33 (Fig. 9) which is integrally formed of blades 34 and 35, and side members 36, 37, 38 and 39 joined together respectively by oval shaped rings 40 and 41. The ring 40 is provided with pairs of lugs 110 and 110a and is slotted as at 111 and 111a. The lugs are provided with pins 97 which engage the slots of the counterweights 96 more presently to be described. The blades 34 and 35 are provided with knife edges which at all times engage the surface of the cam 23 during the rotation of the cam with the core shaft 21.

The sealing member 33 divides the chamber 30 into two separate section chambers, 30a and 30b, each of which has inlet and outlet ports leading to the pressure regulating valve 46 presently to be described.

Provided in the casing 26 and communicating with section chambers 30a and 30b are outlet ports 42 and 42a respectively. Communicating with said ports are conduits 43 and 43a, which communicate with other conduits 44 and 44a and ports 45 and 45a, leading into the pressure regulating valve 46. Leading from the valve 46 are ports 47 and 47a, which communicate respectively with oppositely positioned conduits 48 and 48a which lead to a general reservoir and cooling chamber 49. Communicating with said chamber are inlet ports 50 and 50a each leading respectively to section chambers 30b and 30a of chamber 30.

Referring specifically to the regulating valve 46, I provide a longitudinal bore 58 in the housing 26b, within which is slidably fitted the piston 59, which is adapted to open and close the valve ports 47 and 47a. Threaded into one end of the bore 58 is a reducing plug 60 provided with a shoulder 60a adapted to fit snugly within the inner bore of the piston. Said reducing plug is adapted to accommodate a plunger rod 61 which passes through an opening in the housing to permit manual operation as by the attached plate 62 more presently to be described.

The purpose of the reducing plug is to diminish the pressure area of the piston.

Keyed as at 63 to the interior of core shaft 21, for longitudinal sliding movement is a plunger 64 which is internally threaded as at 65. The plunger has an extension 64a which engages the piston 59 to the regulating valve. Threaded to the plunger is a plunger extension sleeve 66 which is internally threaded as at 67 and which is provided with an internal key way 89. Surrounding the sleeve 66 is a spring 69, one end of which rests against a shoulder 70 on the sleeve and the other end against the flange 71 of the spring casing 72, which encloses said spring. Secured to said spring casing as by bolts are link members indicated as at 73, which extend through convenient openings indicated as at 21c in the core shaft 21, and which support a ring member 74, provided with a beveled surface. Three of such links are used.

Threaded to the interior of sleeve 66 is the extension 75 of another sleeve 76. Surrounding said sleeve 76 is a spring 77, one end of which bears against a shoulder 78 on said sleeve and the other end against the flange 79 of the spring casing 80, which encloses said spring. Secured to the said spring casing by suitable bolts are two link members indicated as at 81 which extend through convenient openings indicated as at 21d in the core shaft and which support a ring member 82 provided with a beveled surface.

The core shaft 21 is provided with an end wall 21a, having a threaded opening adapted to accommodate a threaded sleeve 83, provided with a lock nut 83b. Said sleeve is keyed as at 84 to the interior of sleeve 76 to permit longitudinal sliding movement of said sleeve. The sleeve 83 has an adjusting handle 83a mounted at the end thereof, to permit adjustment of said sleeve, in the manner to be described.

Threaded within the sleeve 83 is an adjusting rod 86 provided with an extension 87 extending through the sleeve 76 and its extension 75.

A locking nut 86a is provided to fix the rod in position after adjustment. The adjusting rod 86 is keyed at one end to the interior of the sleeve 66 to permit longitudinal sliding movement and on the other end is provided with a handle 90 to permit external adjustment thereof by means of an opening 21b in the core shaft 21.

Referring to the cam 23 which is keyed as at 22 to rotate with core shaft 21, which cam is more particularly shown in Figs. 2, 3, and 4, it will be seen that the cam is triangularly shaped and that at all times it makes contact at three points with the annular walls of the chamber. It will be particularly noted that the diameter of the cam taken through the center is constant at all angles so that the blades 34 and 35 of the chamber sealing member 33 always contact the cam surface at two points. This provides for a more constant circulation of fluid thereby facilitating smooth performance of the device.

The cam is provided with 3 equally spaced recesses 23a within each of which is adapted to be pivotally mounted as at 91 the governors 92. Three governors are provided within said cam and all are similar in construction. Each of the governors 92 is provided with a beveled cammed surface 92a which is adapted to bear against the beveled ring 74. In operation when the governor is swung outwardly by centrifugal action from the dotted to the full line position in Fig. 3, the ring is urged forwardly or to the right as shown in Fig. 2.

Threaded into the casing adjacent to the chamber 31 is a ring 93 which secures a packing washer 94 adapted to bear against the flange 21f of the core shaft 21 and which serves to retain the fluid under pressure in the device. Oppositely positioned and pivotly secured to ring 93, as at 93a Fig. 6 are two governors indicated as at 95 which are similarly provided with beveled surfaces 95a and adapted to bear against the ring 82 when urged outwardly by centrifugal action.

Pivotally secured on the ring 93 as at 93b in a plane at right angles to the reciprocating motion of the sealing member 33 are offset counterweights 96 Figs. 6 and 8 provided with slots 96a which engage pins 97 mounted on lugs 110, and which permit sliding movement of said pins within said slots. Said counterweights are adapted to counterbalance the sealing member when it is off center and prevent undue vibration of the unit.

For the purpose of using my device as a manually operated clutch, I provide a lever 100 having a yoke 101 which bridges the driven shaft 16 and which is adapted to bear on the plate 62 secured to the plunger rod 61. The lever is fulcrumed as at 103 and is connected at the other end to an actuating rod 104 which is adapted to be manually operated and which when actuated will urge the plate 62 to cause the piston 59 to be moved to the left so that ports 47a and 47 of valve 46 will open fully to permit oil to by pass the valve, thus causing casing 26 to remain uninfluenced by the rotation of cam 23.

Operation

With the car in inoperative or standstill position, the piston 59 of the regulating valve 46 assumes the position indicated by dotted lines in Figure 7 or in full lines in Fig. 2 with the inlet ports 45 and 45a opened and outlet ports 47 and 47a closed. Upon the starting of the motive power the drive shaft 14 will rotate the core shaft 21 and cause the rotation of the cam 23 within the chamber 30, (sections 30a and 30b,) thereby forcing the oil or hydraulic fluid from the chamber through the regulating valve and back into the chamber again in the following manner: Through the chamber outlet ports 42 and 42a respectively through the conduits 43, 43a, 44 and 44a respectively, through the valve ports 45 and 45a and into the valve cylinder 59a. The pressure exerted against the piston 59 will cause it to move towards the left causing the ports 47 and 47a to be opened and permitting a flow of fluid through said ports into conduits 48 and 48a respectively and into conduits 49 and 49a respectively and back into the chambers 30b and 30a by way of inlet ports 50 and 50a respectively. No rotating action is instantly imparted to the housing 26 because of the slip of fluid therein. But due to pre-determined adjustment of springs 69 and 77 against piston 59, a certain amount of restriction to the flow of fluid, progressively starts the housing 26 to revolve. The spring casings 72 and 80 function as abutment structures for the springs 69 and 77 respectively, to urge the plunger 64a against the piston 59 and yieldingly resist its movement to the left.

As the core shaft 21 and cam 23 begin to rotate faster, due to the increased speed of the motive power, the governors 92 on the cam, due to centrifugal action, will be swung from the position in dotted line of Figure 3 to the full line to engage the ring 74 to urge it forwardly or to the right. As the ring moves it will through the connecting links 73 move the spring casing 72 in the same direction against the tension of the spring 69. The spring 69 will act on the shoulder 70 to cause the sleeve 66 and sleeve 64 to slide in the same direction. Thus the extension 64a will engage the piston 59 to urge it to the right to gradually close the ports 47 and 47a and reduce the flow of oil therethrough. With the closing of these ports and the consequent restriction in flow of the fluid, the casing 26 is caused to rotate. As the casing increases its rotation the governors 95 of said casing will be swung outwardly due to centrifugal action and the beveled cammed surfaces will engage the ring 82 to urge it to the right and through the links 81 cause the spring casing 80 to compress the spring 77 which in turn bears against the shoulder 78 of the sleeve 76.

As the spring moves to the right it will through the threaded extension 75 urge the sleeve 66 further to the right and through the sleeve 64 and its extension 64a further actuate the piston 59 thus tending to further close the ports 47 and 47a. After sufficient momentum has been attained the piston will be in position so that the ports 47 and 47a will be closed so that no fluid can pass therethrough and at said time the core shaft 21 and cam 23 will be locked and rotate directly with the casing 26, since the circulation of the hydraulic fluid is completely arrested. It will be understood of course that rotation of the casing 26 which is connected to the driven shaft 16 will in turn rotate said shaft to drive the wheels of a car.

If it is desired to effect a reverse or back up drive the core shaft 21 and casing 26 will be rotated simultaneously as a direct drive. When the shaft 14 rotates to drive the core shaft 21 in a reverse direction, the cam 23 will be rotated clockwise, as viewed in Fig. 3, causing a circulation of oil, reverse to the one heretofore described. The rotation of the cam 23, in a clockwise direction, causes the governors 92 to swing outwardly instantaneously causing the contact portion of the governors 92 to abut the ring 74 and urge it forwardly or to the right. As previously described the extension 64a will engage the piston 59 and urge it to the right partially closing the ports 47 and 47a. Whereas the conduits 48 and 48a previously served to conduct fluid from the valve 46 to the chambers 30b and 30a, a reversal in the flow of fluid through said conduits is now effected. Since the ports 47 and 47a are partially closed, the flow of fluid through the valve 46 is restricted and rotation to the housing 26 is thereby imparted. Instantaneously the governors 95 swing outwardly and, as previously described, serve to further urge the piston 59 to close the ports 47 and 47a to completely restrict the flow of fluid. It will thus be seen that on reversing the direction of rotation there is an instantaneous impartation of rotation to the casing 26.

If it is desired to operate my device as a clutch, the lever 100 is actuated through the manually operated rod 104 to push the piston to the left as viewed in Figure 2 and the ports 47 and 47a of said valve will be opened to permit the passage of the fluid and no rotating action will be imparted to the casing and the device will be operating as a clutching mechanism.

Instead of mounting my device rearwardly of the clutching mechanism 12 and the transmission 13 I can eliminate one or both of same and operate the driving shaft 14 directly from the motor 11, in this manner my device combines the functions of a clutch and gear transmission of an automobile and serves automatically to adjust the power yielded to the power required. For certain purposes it may be advantageous to position my device between the prime mover and the gear transmission. It will be understood that this device can be positioned any place in the line of power drive without departing from the purpose and scope of this invention.

*Adjustment*

Referring to Fig. 2 it will be seen that the means provided for adjustment permit a high degree of accuracy and a wide latitude in regulation necessary to meet a variety of operating conditions. The adjusting handles 83a and 90 regulate the rate of acceleration of the housing 26 with reference to the rotational speed of the core shaft 21.

An adjustment may be made in the following manner:

The locking nuts 83b and 86a are loosened and the loosened and the adjusting handle 83a is turned to advance or retract the sleeve 83 within the end wall 21a. Since said sleeve is keyed to the sleeve 76 and its extension 75 which in turn is threaded into the sleeve 66 the same movement is imparted to the sleeve 66 and the plunger 64a is thereby caused to be correspondingly advanced or retracted. Should a closer adjustment be necessary the adjusting sleeve 83 is locked as by the locking nut 83b and the adjusting handle 90 is manipulated to advance or retract the adjusting rod 86 which in turn transmits a corresponding longitudindal movement to the plunger 64, which actuates the piston 59 and influences the position of the piston relative to the valve ports when the device is in non-operating position.

Instead of using my device for driving an automobile, my mechanism can be used equally well for effecting other drives, as where instead of connecting the driven shaft 16 to drive the traction wheels of a motor vehicle, a pulley can be mounted on the extension of the casing or shaft and through means of a belt, drive other rotating members or the casing 26 can be used as a pulley.

Referring to Fig. 10 it will be seen that my device is used as a clutch in cooperation with an electric motor. Directly connected to the driving shaft of an electric motor 150 is the core shaft 21 which operates the device 15 as hereinbefore described. The housing 26 is adapted to act as a pulley for driving a belt 151, and the mechanism indicated generally as at 152 serves as a manual control in the same manner shown in Fig. 2.

It will be understood that various modifications and changes can be made without departing from the spirit and scope of my invention.

What I claim and desire to secure by Letters Patent is:

1. In a device of the character described including a rotatable member driven by a prime mover, a casing enclosing said rotatable member, said rotatable member being triangularly shaped and adapted to contact the inner surface of said casing at three points, a sealing member reciprocably mounted in said casing and adapted to contact said rotatable member, an hydraulic fluid adapted to be actuated by said rotatable member to drive said casing, a valve for controlling the flow of said fluid, said valve adapted to be operated by the speed of rotation of said rotatable member to progressively close said valve to cause said casing to progressively increase its rotational speed.

2. In a device of the character described including a rotatable member driven by a prime mover, a housing having an annular chamber formed therein, said rotatable member mounted in said chamber co-axially with said housing, said rotatable member being triangularly shaped and adapted to abut the inner annular wall of said chamber at three points, a sealing member reciprocably mounted in said housing and adapted to contact said rotatable member, an hydraulic fluid adapted to be circulated within said housing, a valve for controlling the flow of said fluid, means on said rotatable member for progressively closing said valve to restrict the flow of said fluid and progressively increasing the rotational drive on said casing.

3. In a device of the character described including a casing, a cam rotatably mounted within said casing and driven by a prime mover, said cam being triangularly shaped and adapted to contact the inner surface of said casing at three points, a sealing member reciprocably mounted in said casing and adapted to contact said cam, an hydraulic fluid within said casing adapted to be circulated by the rotation of said rotatable member, a valve operated by the rotational speed of said cam, said valve adapted to be progressively closed to restrict the flow of the fluid as the rotational speed of said cam increases, the restriction of the flow of the fluid determining the rotational speed imparted to the casing.

4. In a power transmitting device including a shaft adapted to be rotated, a triangularly shaped cam on said shaft, a housing enclosing said cam, said cam having a constant diameter at all angles about its axis of rotation and adapted to abut the inner wall of said housing at three points, a sealing member reciprocably mounted in said housing and adapted to contact said cam, a valve automatically operative for gradually restricting the flow of the fluid as said cam increases its rotational speed, said fluid adapted to drive the housing at a rotational speed dependent upon the restriction of flow of said fluid.

5. In a power transmitting device, a housing having an annular chamber formed therein, a rotatable member mounted in said chamber co-axially with said housing, said rotatable member being triangularly shaped and having a constant diameter at all angles about its axis of rotation, said rotatable member adapted to abut the annular walls of said chamber at three points thereon, a sealing member reciprocably mounted in said housing and adapted to contact said rotatable member, an hydraulic fluid within said housing adapted to drive said housing, means for controlling the flow of the hydraulic fluid, said means actuated by the rotational speed of said cam, with an increase in the rotational speed of the cam, causing a proportional increase to the restriction to the flow of the fluid, and thereby proportionally increasing the rotation of said housing.

6. In a power transmitting device including a cam adapted to be rotated, a housing enclosing said cam, an hydraulic fluid within said housing adapted to drive said housing, a valve for controlling the flow of fluid, governors on said cam adapted to operate said valve to control the flow of the fluid, governors on said housing adapted to further actuate said valve, said valve adapted when fully closed to cause said housing to rotate simultaneously with said cam.

7. In a power transmitting device, a housing having an annular chamber formed therein, a rotatable member mounted in said chamber co-axially with said housing, said rotatable member being triangularly shaped and adapted to abut the inner annular wall of said chamber at three points, a hydraulic fluid within said housing, governors on said rotatable member adapted to activate a valve to control the flow of said fluid, governors on said housing adapted to further activate said valve, said valve when completely closed adapted to cause said housing to rotate simultaneously with said rotatable member.

8. In a power transmitting device, a housing, a rotatable member mounted in said housing coaxially therewith, a hydraulic fluid within said housing, a valve for controlling the flow of fluid, governors on said rotatable member adapted to partially close said valve to restrict the flow of fluid therethrough, said restriction of flow of fluid imparting a rational motion to said housing, governors on said housing adapted to be actuated by said rotational motion to further close said valve, said valve when fully closed adapted to completely resist the flow of fluid and to cause said housing to rotate simultaneously with said rotatable member.

9. In a power transmitting device a housing having an annular chamber formed therein, a rotatable member coaxially mounted in said chamber, said rotatable member being triangularly shaped and having a constant diameter at all angles about its axis of rotation, said rotatable member adapted to abut the annular walls of said chamber at three points thereon, a sealing member slidably mounted in said chamber and rotatable therewith, said member adapted to contact the surface of said rotatable member at diametrically opposed points on said surface, counterweights mounted on said slidable member and adapted to counterbalance said slidable member during its rotational movement.

10. In a power transmitting device, a housing having an annular chamber formed therein, a rotatable member coaxially mounted in said chamber, said rotatable member being triangularly shaped and adapted to abut the inner annular wall of said chamber at three points, the diameter of said cam being constant at all angles about its axis of rotation, a sealing member slidably mounted in said chamber and rotatable therewith, said member provided with fixed blades which are adapted to contact the surface of said rotatable member at diametrically opposed points on said surface, a hydraulic fluid within said housing a valve to control the flow of said fluid, governors on said rotatable member and on said housing adapted to actuate said valve to restrict the flow of fluid and thereby cause said housing to rotate simultaneously with said rotatable member.

11. In a power transmitting device, a housing, a rotatable member mounted in said housing, said rotatable member being substantially triangularly shaped such that the diameter thereof is the same at all angles about its axis of rotation, a sealing member slidably mounted in said housing and adapted to contact the periphery of said rotatable memebr at diametrically opposed points, a hydraulic fluid within said housing, means responsive to the rotational speed of said rotatable member for automatically regulating the rate of flow of fluid in said housing.

12. In a power transmitting device, a housing, a rotatable member mounted in said housing, said rotatable member being substantially triangularly shaped and such that the diameter thereof is the same at all angles about its axis of rotation, a sealing member slidably mounted in said housing, said sealing member being formed of a pair of opposed blades integral with each other but separated by a distance equal to the diameter of said rotatable member, said sealing member thereby being adapted to contact the periphery of said rotatable member at diametrically opposed points, a hydraulic fluid within said housing, means responsive to the rotational speed of said rotatable member for automatically regulating the rate of flow of fluid in said housing.

13. In a power transmitting device, a housing having an annular chamber formed therein, a rotatable member mounted in said chamber, said rotatable member being substantially triangularly shaped such that the diameter thereof is the same at all angles about its axis of rotation, a sealing member slidably mounted in said housing and adapted to cooperate with said rotatable member to divide said annular chamber into two substantially liquid-tight compartments, a hydraulic fluid within said chamber, means responsive to the rotational speed of said rotatable member for regulating the rate of flow of fluid from one of said compartments into the other of said compartments.

ANTHONY LISOWSKI.